Oct. 27, 1959   A. N. STANTON   2,910,619
ELECTRIC DISCHARGE DEVICES
Filed March 26, 1954   2 Sheets-Sheet 1

INVENTOR.
Austin N. Stanton
BY Walter J. Jagmin
ATTORNEY

Oct. 27, 1959  A. N. STANTON  2,910,619
ELECTRIC DISCHARGE DEVICES
Filed March 26, 1954  2 Sheets-Sheet 2

INVENTOR.
Austin N. Stanton
BY
ATTORNEY

United States Patent Office 2,910,619
Patented Oct. 27, 1959

2,910,619
ELECTRIC DISCHARGE DEVICES
Austin N. Stanton, Garland, Tex.

Application March 26, 1954, Serial No. 418,885

12 Claims. (Cl. 315—14)

This invention relates to electrical discharge devices and associated circuitry for providing standard or reference voltages to which the outputs of various electrical systems or devices may be compared for the purposes of measurement, calibration or control.

Whether optimum or in some cases even acceptable performance is to be obtained from various electrical devices depends upon the accuracy of the voltage standards available. For example, the accuracy of highly precise measuring instruments, especially when small variations are being measured, is a direct reflection of the electrical standards, such as voltage, available for initially calibrating the instrument or for inclusion in the circuit of the instrument for affecting operation thereof. It is obvious that such standards are equally important to precision power supply devices and delicate electrical control or regulating devices.

Accordingly, it is an object of this invention to provide a new and improved means for deriving a standard voltage.

It is another object of this invention to provide a voltage standard discharge device whose operation is based on fixed ratios of electrical charge to physical mass of discharge particles and on the geometry of the discharge device.

It is another object of this invention to provide a voltage standard discharge device whose current is a function only of the applied voltage.

It is another object of this invention to provide a device for deriving a stable standard voltage from a variable voltage source.

It is still another object to provide a device for producing a varying electric current by directional changes in an electron stream resulting from changes in the velocity of the electrons of the stream.

The objects and others which will become apparent from the following description of the invention taken in conjunction with the accompanying drawings in which.

The operation of the various embodiments of this invention is based on the principles governing the behaviour of electrons or other positively or negatively charged particles in the presence of separate and/or coincident magnetic and electrostatic fields. Structurally each embodiment consists of an evacuated envelope in which is disposed in various configurations to be discussed later, a source of electrons or other positively or negatively charged particles, various electrode structures for establishing electrostatic fields, coil arrangements or other means for establishing magnetic fields, and various sensing electrode structures for collecting the electrons or other charged particles from the source which are not diverted therefrom by the action of the magnetic or electrostatic fields. The tubes of these embodiments may also include therein supplementary interconducting electrode structures whose interconduction is affected by the charges attained by the sensing electrodes.

Figure 1:
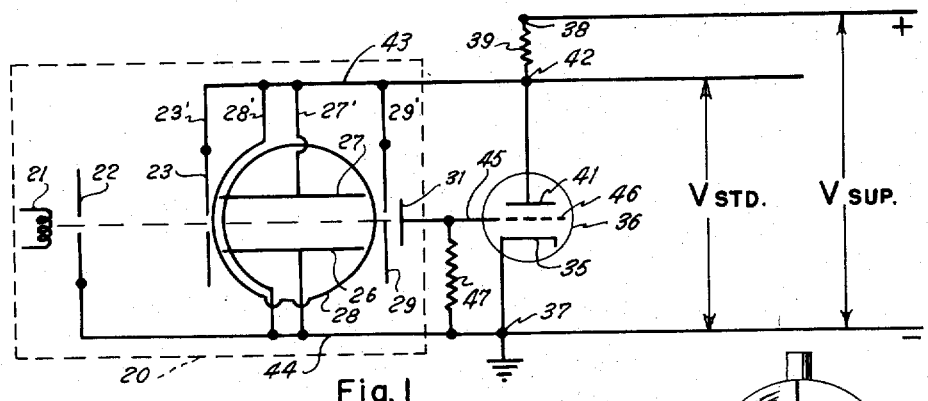
Figure 1 illustrates diagrammatically an electric circuit employing a preferred form of my new and improved voltage standard discharge device.
Figure 3:
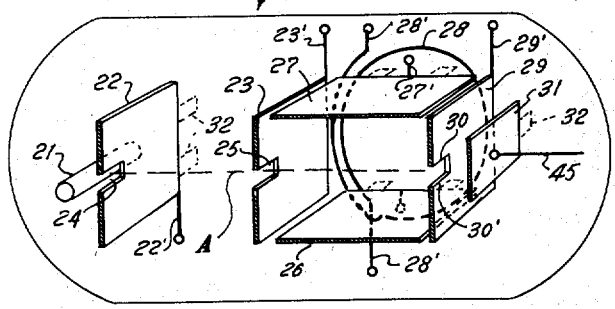
Figure 3 is an isometrical section of Figure 2.
Figure 2:
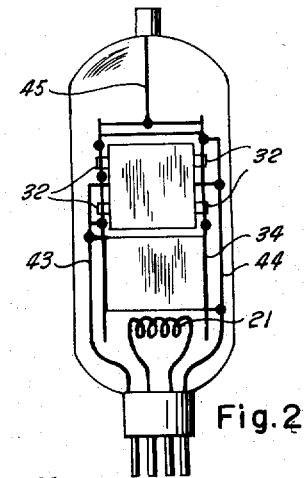
Figure 2 is a structural representation of the voltage standard discharge device shown diagrammatically in Figure 1.

The voltage standard tube 20, shown schematically in Figure 1 and structurally represented in Figures 2 and 3, has a conventional filament or source 21 of electrons, negative ions, or positive ions; an accelerator section comprising accelerator plates 22 and 23 which are perpendicular to the axis A of the tube and have central apertures or slits 24 and 25 whose axes coincide with the axis A; a velocity selector comprising selector plates 26 and 27 situated one on each side of the axis A with the longitudinal axes thereof and axis A being in a plane which is perpendicular to the opposing faces of the selector plates, a coil 28 which is laterally offset from axis A and whose central axis perpendicularly intersects axis A and is parallel to the opposing faces of the selector plates 26 and 27, a shielding plate 29 which is perpendicular to axis A and has a central aperture or slit 30, the midpoint of lower edge 30' coincides with axis A; and a target or collector plate 31 disposed perpendicularly to axis A with its mid-point coincident with axis A. As shown in Figure 2, the various plates are mounted by means of tabs 32 to insulating plates 33 and 34 which may be made of mica or other suitable material. The various plates are made of conductive materials conventionally used in tube structures. Plates 23, 27 and 29 and one side of coil 28 are connected by leads 23', 27', 29', and 28', respectively, to lead 43 for connection to the external circuit shown in Figure 1. Plates 22 and 26 and the other side of coil 28 are connected by leads 22', 26' and 28'', respectively, to lead 44, also, for connection to the external circuit of Figure 1.

Since the source 21 may supply positively or negatively charged particles and the polarity of various elements of the tube must be reversed for oppositely charged particles, the initial description of the operation of the tube will cover the use of an electron source and obviously will also be valid for the use of negative ion sources.

Some of the electrons emitted from source 21 will find their way to the slit 24 in accelerator plate 22. These electrons will be accelerated toward accelerator plate 23 if a voltage is applied between accelerator plates 22 and 23 with the polarity of accelerator plate 22 negative and accelerator plate 23 positive. Those electrons which lack a sufficient velocity component perpendicular to axis A to drift them radially from axis A beyond the periphery of slit 25 in the time they travel from plate 22 to accelerator plate 23 will pass through slit 25. Upon passing slit 25 the electrons enter the velocity selector section which passes only those electrons having a velocity $V_o$. Velocity selection is accomplished by the combined action of an electrostatic field between velocity selector plates 26 and 27, and, a magnetic field which is perpendicular to the electrostatic field and extends in a direction parallel to the faces of plates 23, 29, 26 and 27 in the volume defined by these plates. Since the initial motion of the electrons entering the velocity selector is along axis A, they will be urged in a direction perpendicular to axis A by each field. If a voltage is applied to velocity selector plates 26 and 27, with the polarity of velocity selector plate 26 being negative and of velocity selector plate 27 being positive, the resulting electrostatic field extending between velocity selector plates 26 and 27 will exert a force on the moving electrons urging them toward the positive plate 27. If simultaneously a voltage is applied to coil 28 of such polarity as to cause counterclockwise current flow, the resultant magnetic field which in the case of Figure 1 will be toward the reader and perpendicular to the plane of the coil, will exert a force on the moving electrons urging them in the opposite direction toward velocity selector plate 26. Since these forces act in opposition to each other it follows that if their magnitudes are equal, there will be no resultant force acting on the electrons in a direction perpendicular to their direction of travel. Therefore the electrons will pass through the velocity selector section without being diverted from their path along axis A. This can be demonstrated mathematically by assuming the force exerted by the electrostatic field, which is equal to $Eq$, where $E$ is the field intensity and where $q$ is the charge of an electron passing through the field; and the force exerted by the magnetic field, which is equal to $$\frac{Hvq}{c}$$

where $H$ is the field of intensity, $v$ is the velocity of an electron passing through said field, and $c$ is a constant for conversion of units, to be equal as follows:

$$Eq = \frac{Hvq}{c} \quad (1)$$

or, $$v = \frac{E}{H} c \quad (2)$$

which indicates that only for those electrons having a velocity $v$ will the deflecting forces be of equal magnitudes. It follows that if appropriate values of magnetic and electrostatic fields are selected so that $v$ is equal to $vo$ then the only electrons that would pass shielding plate 29 through slit 30 are those having a velocity $V_o$. These electrons then strike plate 31 causing it to have a negative charge which varies in direct proportion to variations in the rate at which the electrons strike plate 31.

Standard or reference voltages can be derived from unstable voltage sources if such a tube is included in a circuit such as that shown in Figure 1. Here it is seen that an unstable voltage source $V_{sup}$ is connected across the cathode 35 of tube 36 at ground point 37 and to the plate 41 of tube 36 through resistor 39 and the standard or reference voltage $V_{std}$ appears across the plate 41 and cathode 35 circuit between point 42 and the common ground point 37. The operating voltages of the voltage standard tube 20 are also derived from the end 42 on resistor 39 and the common ground 37 through leads 43 and 44, respectively, as previously described. The output of the standard tube 20, derived from plate 31, is fed through lead 45 to the grid 46 of tube 36 which lead is connected through resistor 47 to the common ground point 37 through lead 44 to provide a ground return for grid 46. As previously described, accelerator plate 22 of the accelerator portion of tube 20 and one side of coil 28 and plate 26 of the velocity selector portion of tube 20 are connected to ground point 36 by means of lead 44 while the positive side of $V_{std}$ at point 42 is connected to plate 23, coil 28 and velocity selector plate 27 of tube 20.

Standard voltage $V_{std}$ is derived from an unstable voltage source $V_{sup}$ by means of this circuit in the following manner. When the value of $V_{sup}$ increases over its average or rated value the value of $V_{std}$ is maintained to within minute fractions of its desired value by virtue of variable conduction through tube 36 between point 42 and ground 37. The variable conduction through tube 36 is controlled by the application of the output of tube 20 to the grid 46 of tube 36.

The circuit of Figure 1 is basically a voltage divider comprising a fixed impedance resistance represented by the plate resistance of tube 36 between point 42 and ground point 37 with $V_{sup}$ applied between point 38 and ground point 37 and $V_{std}$ being taken between point 42 and ground point 37.

When $V_{sup}$ decreases in value, or when the current demand of the load supplied by $V_{std}$ increases the incremental voltage, changes tending to lower $V_{std}$ are immediately sensed by the accelerator plates 22 and 23 of tube 20 which results in a slight decrease in the speed of electrons entering the velocity selector section of tube 20 since the beam of electrons passing through the accelerator normally is partially blocked by the lower side of slit 30 and since incremental decreases in the speed of each electron normally present in the stream at this point will shift more of the electrons toward velocity selector plate 27 whereby more electrons will strike collector plate 31. Since the number of electrons striking collector plate 31 per unit time determines the potential drop across resistor 47 and in turn the potential or bias of grid 46 of tube 36, it is apparent that the bias of grid 46 becomes more negative thus lowering the current flow through tube 36. The decreased current flow through tube 36 lowers the voltage drop between point 42 and ground point 37 thus tending to restore $V_{std}$ to its desired value. If, on the other hand, $V_{std}$ tends to increase in value, the voltage applied to accelerator plates 22 and 23 increases, thus increasing the speed of the electrons entering the velocity selector section. In this case the force from the magnetic field of coil 28 predominates and swings the electron stream toward velocity selector plate 26 which in turn decreases the number of electrons striking collector plate 31, thereby lowering the potential drop across resistor 47. With the decreased potential drop across resistor 47, it follows that grid 46 of tube 36 goes more positive with respect to cathode 35 thereby increasing conduction through tube 36 which lowers $V_{std}$ to its desired value. Due to the rapid response of tube 20 to voltage changes, the incremental voltage changes in $V_{std}$ are held to very small fractions of $V_{std}$ thus yielding a reliable standard voltage.

The slight variations in the rate of emission of particles from filament source 21 due to variations in heater voltage do not materially affect the output of tube 21, or the other modifications thereof described herein, because the potentials applied to the accelerator plates are well beyond the value at which filament saturation occurs. Due to the rapid response of tube 20 to voltage changes, the incremental voltage changes in $V_{std}$ are held to extremely small fractions of V*std* thus yielding a reliable standard voltage.

Figures 4, 5:
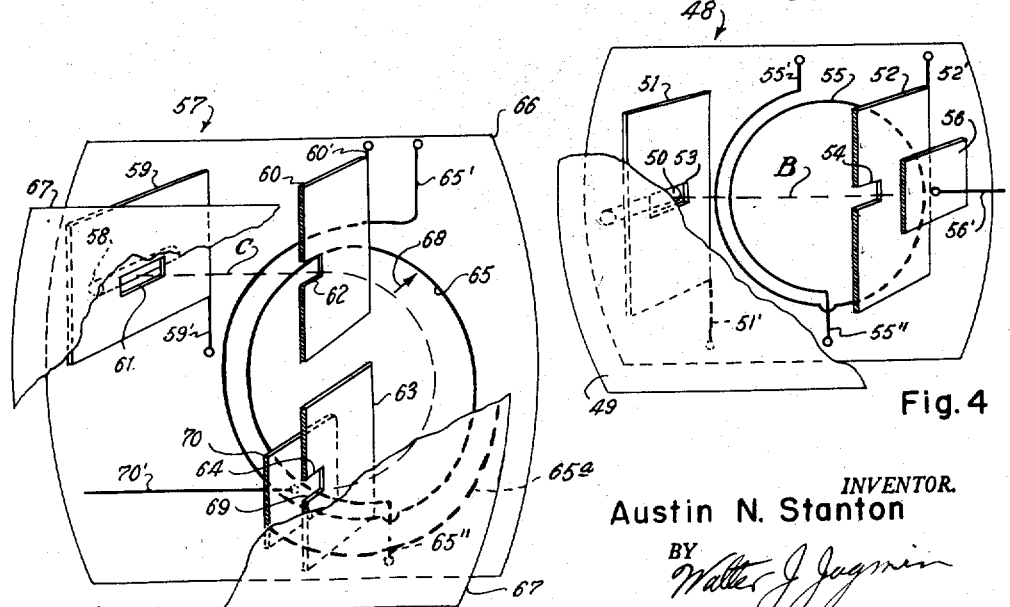
Figure 4 is an isometrical view with parts broken away of another embodiment of my voltage standard discharge device.
Figure 5 is an isometrical view with parts broken away of another embodiment of my voltage standard discharge device.

Figure 4 shows a simplified form of the tube 20 of Figures 2 and 3, designated by the reference character 48, which accomplishes the same results as tube 20 and can be used in place of tube 20 in the circuit shown in Figure 1 with leads 55' and 52' connected to point 42, leads 51 and 55" connected to point 37, and lead 56' connected to grid 46. In this embodiment of tube 20, the accelerating and velocity selective sections are combined in a more simplified structural arrangement. The various structural members of tube 48 are similar in configuration to those in tube 20 and are mounted in a conventional envelope by means of the insulating supporting plates 49 in the same manner as shown in Figure 3.

The electron source 50 is fixed to supporting plates 49 with the emitting surface thereof facing slit 53. The electrons emitted from source 50 are accelerated along axis B by means of plates 51 and 52 which are energized from a voltage being controlled by the tube with the polarity of plate 51 being negative and plate 52 positive. The slits or apertures 53 and 54 are coaxial with axis B. The velocity selector is composed of a coil 55 mounted on the surface of support 49 between plates 51 and 52. It is to be understood that an additional coil with the windings in the same direction as coil 55 may be provided on the opposite insulating supporting plate 49 as in Figure 3 to provide a more uniform magnetic field. The number of turns and dimensions of coil 55, and the additional coil if provided, are such that upon energization of the coil by the V*std* being controlled the central axis of the stream of electrons occurring when the voltage being controlled is at its standard value will be displaced downwardly from axis B and will coincide with the central point of the bottom edge of aperture 54 and strike the target plate 56 while the lower half of the stream will be blocked by plate 52. With this normal position of the electron stream it is seen that when V*std* tries to seek a lower value the stream will tend to drift back toward the axis B thereby charging target plate 56 to a more negative value which in turn would increase the bias on grid 46 to reduce conduction through tube 36 to raise V*std* to its desired value. If V*std* tends to increase in value the speed of the electron stream increases and also the magnetic field derived from the velocity selector coils increases in intensity to divert the stream further below axis B at slit 54 thereby reducing the number of particles reaching target plate 56 to effect increased conduction through tube 36 which lowers V*std* to its desired value. Although the incremental voltage changes in the voltage supplied to accelerator plates 51 and 52 are the same, the output of plate 56 still increases for low voltage conditions and decreases for overvoltage conditions because corresponding changes occur in the magnitude of the magnetic field produced by coil 55 which divert the electron stream progressively downwardly for higher voltages due to higher electron velocities afforded by the higher voltage between accelerator plates 51 and 52. Thus it can be seen that for decreases in voltage more electrons will strike plate 56 and for increases in voltage less electrons will strike plate 56.

Figure 5 shows another embodiment of tube 20 which also may be used in place of tube 20 in the circuit of Figure 1 without altering the performance of the circuit. In this modification leads 60' and 65' are connected to point 42 and leads 59' and 65" are connected to point 37. The tube of this embodiment which is designated as tube 57 in Figure 5 comprises an electron emitter 58, an electron accelerating section comprising plates 59 and 60 which are perpendicular to axis C and are provided with slits or apertures 61 and 62 which are coaxial with axis C, and velocity selective portion comprising third plate 63 which is situated in the same plane as plate 60 but laterally displaced therefrom and is provided with a slit or aperture 64 whose axis is parallel to axis C and in a common plane therewith. The velocity selective portion further comprises a coil means for producing a magnetic field in the area of slits 62 and 64 and extending beyond plates 60 and 63. The direction of the field is perpendicular to the plane in which axis C and the axis of slit 64 lie. The coil means for producing this field comprises a single coil 65 which is mounted on one of the insulating plates 66 for supporting the various elements of the tube. The coil means may include an additional coil wound in the same direction which is mounted on the other insulating support plate 67. The various structural elements of tube 57 are mounted in an evacuated element which is provided in reference to tubes 20 and 48.

In this modification the electrons emitted from source 58 that find their way through slit 61 are accelerated along axis C between plates 59 and 60 as a result of the application of a voltage derived from V*std* which is impressed on these plates with the polarity of plate 59 being negative and plate 60 being positive. The electrons passing through slit 62 enter the magnetic field produced by coils 65 and 65A. Since the direction of the magnetic field is into the plane of Figure 5 as indicated at 68, these electrons are deflected in a circular direction toward slit 64 within the plane common to axis C and the axis of slit 64 in accordance with the relationship:

$$HEv = \frac{MV^2}{R} \qquad (3)$$

or, $$R = \frac{vM}{HE} \qquad (4)$$

where: R is the radius of the circular path in which the electrons travel in the magnetic field, $v$ is the velocity of the electron, H is the intensity of the magnetic field, and E is the charge on the electron. From Equation 4 we see that the only variables present for variations in V*std* which energizes the acceleration section and the coil 65 and the additional coil if provided, are the velocity of the electrons and the intensity of the magnetic field. If for the normal value of V*std* the stream of electrons passing slit 62 is deflected toward slit 64 in a circular path of radius R, and the distance between axis C and edge 69 of slit 64 is equal to 2R, half of the electron stream will pass through slit 64 and strike target plate 70 and the other half will be deflected by the portion of plate 63 beyond edge 69. Thus it is seen that an incremental increase in V*std* will increase R causing the stream of electrons to move away from slit 64 while an incremental decrease in V*std* will cause R to decrease thereby moving the stream back to slit 64 in a direction such as to increase the portion of the stream impinging on target plate 70. With this mode of operation it is apparent that tube 57 may also be used in place of tube 20 in the circuit of Figure 1.

Figure 6:
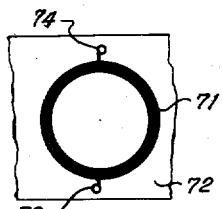
Figure 6 is a coil arrangement for use in the various embodiments of my voltage standard discharge device.
Figure 7:
Figure 7 is another coil arrangement for use in the various embodiments of my standard voltage discharge device.
Figure 8:
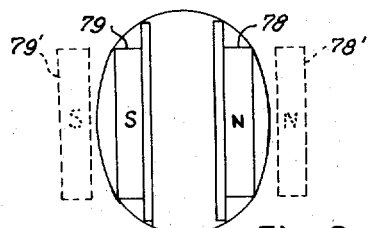
Figure 8 is a structural representation of alternative means for establishing magnetic fields in the various embodiments of my voltage standard discharge device.

Figures 6 through 8 show various arrangements for providing the magnetic field necessary for the operation of tubes 20, 48 and 57. The type coil structure described in the above description of each of these tubes is shown at 71 in Figure 6. This coil consists of a plurality of windings of insulated wire which are retained in coiled form by an impregnation of suitable adhesive material which can also be used to adhere the coil to the insulating support plate 72. The ends of coil 71 are affixed to suitable terminals 73 and 74 which are attached to the support plate. It is to be understood that any conventional means such as staples or cord ties may be used to secure coil 71 to the support plate. Figure 7 shows another arrangement for providing a coil 75 on support 72. The coil consists of a conventional printed circuit in a spiral configuration to permit the disposition of a plurality of windings on the flat surface of the support 72. Coil 75 is provided with terminals 76 and 77 which are of the same type employed in Figure 6. The arrangement shown in Figure 8 consists of permanent magnets or electromagnets which are suitably disposed on the support plates inside the tube envelope with the north pole piece 78 on one side of the area in which the magnetic field is desired and the south pole piece 79 on the side as shown. The magnetic pole pieces can of course be suitably disposed outside of the tube envelope as shown at 78' and 79'.

Figure 9:
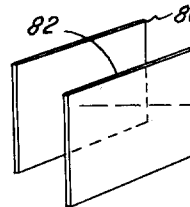
Figure 9 is an alternative target plate arrangement for use in the various embodiments of my voltage standard discharge device.
Figure 10:
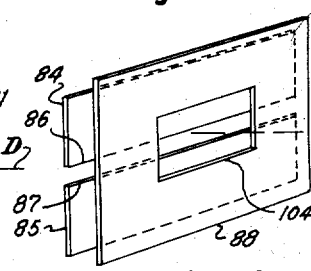
Figure 10 is another alternative target plate arrangement for use in the various embodiments of my voltage standard discharge device.

Figures 9 and 10 show alternative target plate and shield plate structures for use in tubes 20, 48, and 57. The target plate 80 in Figure 9 which is identical to target plates 31, 56, and 70 of tubes 20, 48, and 57 is mounted behind a shielding plate 81. The edge 82 of plate 81 is so positioned that for the normal value of V$std$ half of the stream of electrons traveling along axis D in the direction indicated will strike plate 81 and the other half will pass to the target plate. Plates 80 and 81 are so oriented in each tube that an upward drift of the electron stream, as a result of an incremental decrease in the value of V$std$, will swing the stream of electrons from edge 82 of plate 81 to full impingement on plate 80 while a downward drift resulting from an incremental increase in the value of V$std$ will swing the stream of electrons to full impingement on plate 81.

The double target plate arrangement 83 in Figure 10, when used in place of the previously described target plate arrangements in tubes 20, 48, or 57, makes it possible to utilize twice the maximum charge attainable with the single target plate arrangements previously described. Arrangement 83 comprises two target plates 84 and 85 which are positioned in a common plane perpendicular to the path of the electron stream for normal values of V$std$ which path corresponds to axis E. The edges 86 and 89 of the target plates lie in closely spaced relation on opposite sides of axis E whereby for normal position of the electron stream equal numbers of electrons impinge on each plate if the spacing is less than the width of the stream or if the spacing is equal to or slightly greater than the width of the stream there is no impingement of electrons on either target plate. It is apparent from the previously described operation of each of these tubes that for incremental increases in V$std$ the electron beam swings toward target plate 85 and for incremental decreases in V$std$ the beam swings toward target plate 84. The shielding plate 88 is used in place of plate 30 in tube 20, plate 52 in tube 48, and plate 63 in tube 57. Plate 14 is positioned so that slit or aperture 104 is coaxial with the axis of the electron stream for the desired or rated value of V$std$. Thus modified, these tubes may be employed in the conventional voltage regulator circuit as shown in Figure 11.

Figure 11:
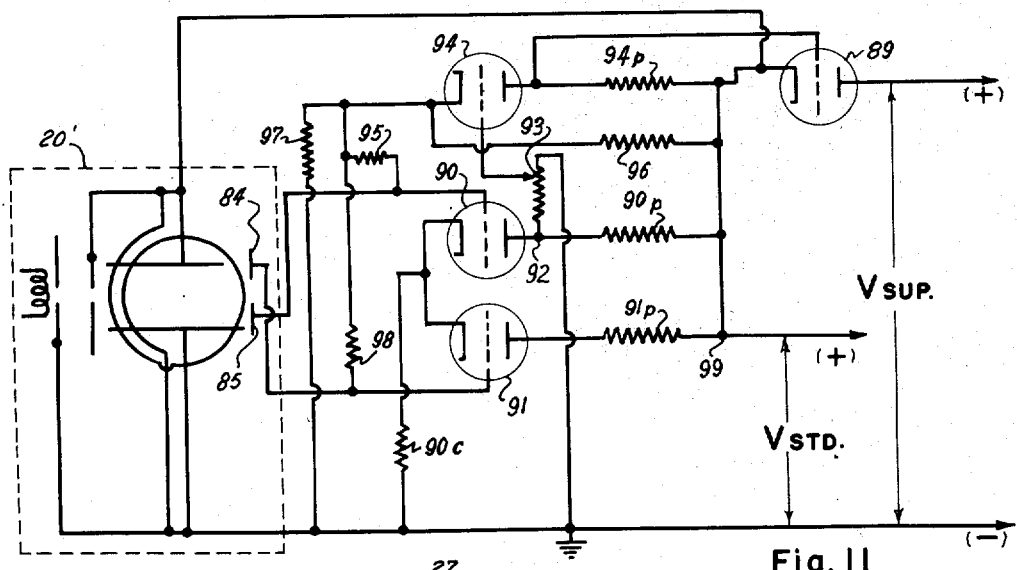
Figure 11 illustrates diagrammatically an electric circuit employing the various embodiments of my voltage standard discharge device utilizing the target plate arrangement of Figure 10.

Since the operation of the circuit of Figure 11 is identical for each of the various embodiments of the voltage standard tubes modified to include the double target plate arrangement of Figure 10, only the circuit embodiment including the modified form of tube 20 shall be described in detail.

The circuit of Figure 11 effects stabilization of the standard voltage output, V$std$, by means of variations in the plate resistance of the triode 89 in accordance with the output signals of target plates 84 and 85 of the voltage standard tube 20'. Briefly stated the circuit comprising the two triodes 90 and 91, the plate resistors 90$p$ and 91$p$, and the common cathode resistor 90$c$ is a voltage difference amplifier the output of which can be made to increase or decrease in accordance with the difference in the potentials applied to the grids of the triodes. The grids of these tubes are energized by the output signals of the target plates 84 and 85. This establishes a signal at point 92 in the plate circuit of tube 90 whose voltage varies in accordance with momentary changes in the value of V$std$. This signal is applied through resistor 93 to the grid of an amplifier tube 94 to reproduce the signal in an amplified form in the plate circuit of the tube. The amplified signal is then applied to the grid of tube 89 to effect changes in the plate resistance of the tube which cause compensating variations in the voltage drop across the tube to maintain the cathode potential, hence the value of V$std$, constant.

When an incremental increase occurs in the value of V$std$ resulting from either a decrease in the load supplied by V$std$ or an increase in V$sup$, as previously described in conjunction with Figure 10 the electron beam of tube 20' swings toward plate 85 resulting in an increase in the output of plate 85 and a decrease in the output of plate 84. This causes the grid of tube 90 to go more negative due to the increased voltage drop in resistor 95 which is connected to the voltage divider comprising resistors 96 and 97 and the grid of tube 91 to go more positive due to the decreased voltage drop in resistor 98. It then follows that the division of current from the positive V$std$ lead at point 99 to the negative or grounded lead of V$std$ through plate resistors 90$p$ and 91$p$, of tubes 90 and 91, and the common cathode resistor 90$c$ is such that the potential of the plate of tube 90 becomes more positive and the plate of tube 91 becomes more negative. The voltage applied to the grid of tube 94 from point 92 then is more positive, resulting in a more negative plate potential for tube 94 because of a larger voltage drop across plate resistor 94$p$. The grid of tube 89 also becomes more negative which results in an increase in plate resistance hence a large voltage drop across the tube to prevent V$std$ from increasing in value.

A decrease in the voltage drop across tube 89 occurs for an incremental decrease in V$std$ since the output target plate 84 increases and output of target plate 85 decreases causing the current flow between point 99 and ground to raise the plate potential of tube 91 and to lower the plate potential of tube 90 which reverses the situation described above for an increment increase in V$std$.

Figure 12:
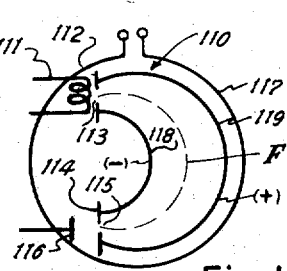
Figure 12 is another embodiment of my voltage standard discharge device.

The form of the standard voltage tube shown in Figure 12 features a simplified structural arrangement which retains all the advantages of the previously described forms and offers the additional advantage of higher target plate currents. Structurally this tube, which is designated by the reference character 110, comprises a conventional source of charged particles 111, an apertured plate 112 which is similar to plate 60 of Figure 5 and is provided with an aperture 11 at 113. A second plate 114 is transversely spaced from plate 112 and is provided with a central aperture 115 similar to plate 63 of Figure 5, an anode or target plate 116 identical to 70 in Figure 5, means for producing a magnetic field which is conveniently shown as a coil 117, and curved plates 118 and 119 which are positioned one on each side of path F, and support members 120, of which only one support plate is shown, for maintaining the various elements of the tube in fixed position within a conventional evacuated envelope in the same manner described in conjunction with tube 20. Tube 110 can be substituted for tube 20 in Figure 1 with lead 43 connected to apertured plate 112, curved plate 119, and one side of coil 117 and lead 44 connected to source 111, curved plate 118, and the other side of coil 117. Tube 110 can be similarly substituted for tube 20' of Figure 11.

In this modification the electrons or other negatively charged particles are accelerated from source 111 toward apertured plate 112 due to the potential of plate 112 being positive with respect to source 111. The electrostatic field setup between negatively charged curved plate 118 and positively charged plate 119 and the magnetic field generated by coil 117 which is perpendicular to the electrostatic field are both perpendicular to the charged particles traveling along the central path F. The particles passing through apertured plate 112 in a direction other than along the central path F are focused to the same point on target plate 116 as those traveling along path F due to the difference in intensity of the electrostatic field adjacent the two curved plates 118 and 119, and the uniformity of the magnetic field throughout the space between these plates. Those particles passing through aperture plate 112 in a direction tending to direct them toward plate 119 will receive a greater force from the magnetic field than from the weaker electrostatic field in this area and will be urged back toward the path F while those particles which pass through apertured plate 112 in a direction between path F and curved plate 118 will receive a greater force from the stronger electrostatic field in this area than from the magnetic field and will be forced outwardly toward path F. The spacing of plates 118 and 119, and the dimensions of coil 117 are so selected for the particular value of the standard voltage to be maintained that the particles starting on path F at apertured plate 112 will remain on path F until they strike target plate 116 so long as the standard voltage is maintained. If incremental changes occur in the standard voltage the path for the particles normally traveling on path F will shift toward plate 119 for voltage changes tending increases in V$std$ and toward plate 118 for voltage changes tending to decrease V$std$. Thus, if for standard conditions the center of the stream of particles is focused on the edge of the aperture in plate 114 nearer plate 112 the potential of target plate 116 will vary in the same manner as that of target plate 31 in tube 20 for voltage variations tending to change the value of V$std$.

Figure 13:
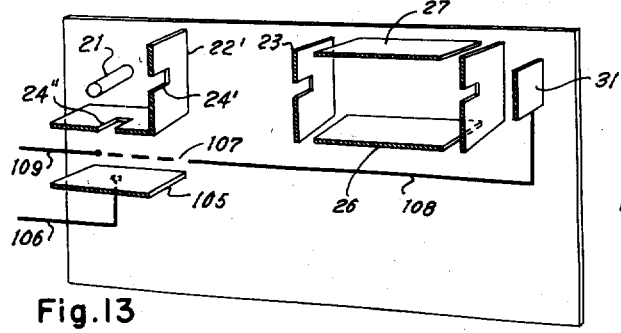
Figure 13 is still another embodiment of my voltage standard discharge device.

This invention also comprehends the inclusion of the elements of tube 36 of Figure 1 within the envelopes of each of the modifications shown in Figures 3, 4, 5 and 12. Figure 13 shows how this may be accomplished using as an example the trube structure of tube 20. The elements comprising tube 20 are mounted in the same manner as previously described, however the apertured plate 22 is provided with a perpendicularly extending plate portion which is apertured at 24" to enable the source 21 to serve both the voltage standard elements from tube 20 and the elements of the triode of tube 36 shown here as anode plate 105 and grid 107. A conductive lead electrically connects target plate 31 to the mesh grid 107. The anode plate 105 provided with leads 106 for connection to point 42 in the circuit of Figure 1 and the grid 107 is provided with a lead 109 to which the resistance 47 can be connected. The operation of this combined tube is obviously the same as that of the separate tubes 20 and 36 in Figure 1.

Obviously each modification of my voltage standard tube described will operate from a conventional positive ion source in lieu of the negative ion or electron sources previously described if the polarity of the various elements of the tubes are reversed to accommodate the oppositely charged particles.

The foregoing description of my invention and certain modes of its application is to be construed as illustrative only, other changes in the shape and arrangement of parts may be employed without departing from the true scope of the invention as further defined in the appended claims.

I claim:

1. A device for establishing a standard voltage from an unstable voltage supply; comprising an electric discharge tube comprising a source of electrically charged particles, anode means for detecting particles traveling from said source along a predetermined path, voltage actuated accelerating means for imparting velocity to said particles along said path proportional to the magnitude of the voltage applied to said accelerating means, velocity selective means for diverting from said path accelerated particles having a velocity other than a specific velocity, means connecting a standard voltage to said accelerating means whereby the rate at which particles are detected by said anode means varies only as a function of the voltage applied to said accelerating means varies and variable control means actuated by the output of said anode means for maintaining a standard voltage.

2. A device for establishing a standard voltage from an unstable voltage supply; comprising an electric discharge tube comprising a source of electrically charged particles, anodes means for detecting particles traveling from said source along a predetermined path, voltage actuated accelerating means for imparting velocity to said particles along said path proportional to the magnitude of the voltage applied to said accelerating means, velocity selective means for diverting from said path accelerated particles having a velocity other than a specific velocity, means connecting a standard voltage to said accelerating means whereby the rate at which particles are detected by said anode means varies only as a function of the voltage applied to said accelerating means varies; variable control means actuated by the output of said anode means for maintaining a standard voltage; said variable control means comprising an amplifier having grid, cathode and plate elements with said cathode connected to a point of electrical ground, said grid being connected to said anode means and said plate being connected to a reference point, said standard voltage being maintained between said ground point and said reference point.

3. A device for establishing a standard voltage from an unstable voltage supply; comprising an electric discharge tube comprising a source of electrically charged particles, anode means for detecting particles traveling from said source along a predetermined path, voltage actuated accelerating means for imparting velocity to said particles along said path proportional to the magnitude of the voltage applied to said accelerating means, velocity selective means for diverting from said path accelerated particles having a velocity other than a specific velocity whereby the rate at which particles are detected by said anode means varies only as a function of the voltage applied to said accelerating means varies, said accelerating means comprising a pair of plates disposed transversely of said path, each of said plates having a central aperture through which said path extends, said variable control means comprising an amplifier having grid, cathode and plate elements with said cathode connected to a point of electrical ground, said grid being connected to said anode means and said plate being connected to a reference point; one plate of said accelerating means being connected to said ground point and the other plate of said accelerator means being connected to said reference point.

4. An electric discharge tube comprising a source of uniform electrically charged particles, anode means for detecting particles traveling from said source along a predetermined path, voltage actuated accelerating means for imparting velocity to said particles along said path, velocity selective means for diverting particles from said path having a velocity other than a specific velocity whereby due to the physical constant of said particles and said tube the rate at which particles are detected by said anode means varies only as the voltage applied to said accelerating means varies.

5. An electric discharge tube comprising a source of uniform electrically charged particles, anode means for detecting particles traveling from said source along a predetermined path, voltage actuated accelerating means for imparting velocity to said particles along said path, velocity selective means for diverting particles from said path having a velocity other than a specific velocity whereby due to the physical constant of said particles and said tube the rate at which particles are detected by said anode means varies only as the voltage applied to said accelerating means varies; variable control means energized by the output of said anode means for maintaining a standard voltage.

6. A device for deriving a stable voltage from an unstable voltage supply comprising: an electric discharge device comprising a source of a stream of electrically charged particles, each having the same mass and electric charge, voltage actuated accelerating means for imparting velocity along a predetermined path to said stream proportional to the voltage applied to said accelerating means; velocity selection means for deflecting said stream to one side of said path for stream velocities lower than a specific velocity and to the opposite side of said path for stream velocities higher than said specific velocity; anode means having an output dependent upon the position of said stream relative to said path; a negative terminal and a first positive terminal adapted to be connected to an unstable voltage supply; a second positive terminal connected by a resistor to said first positive terminal; means for electrically connecting said second positive terminal an said negative terminal to said accelerating means; a grid-controlled electron tube having the plate and cathode thereof connected to said second positive terminal and said negative terminal respectively; and means connecting the output of said anode means to the grid of said tube.

7. A device for deriving a stable voltage from an unstable voltage supply comprising: an electric discharge device comprising a source of a stream of electrically charged particles, each having the same mass and electric charge, voltage actuated accelerating means for imparting velocity along a predetermined path to said stream proportional to the voltage applied to said accelerating means; velocity selective means for deflecting said stream to one side of said path for stream velocities lower than a specific velocity and to the opposite side of said path for stream velocities higher than said specific velocity; anode means having an output dependent upon the position of said stream relative to said path; said anode means comprising a pair of closely spaced plates disposed in a common plane perpendicular to said path with each plate of said pair of plates on opposite sides of said path; a voltage supply having a positive and a negative lead; an electron tube having a plate, cathode and control grid elements with said plate and grid elements connected in series with said positive lead; control means comprising a voltage difference amplifier connected between the cathode of said tube and said negative lead for maintaining a stable voltage between said cathode and said negative lead; and means connecting the output of said anode means to the input of said voltage difference amplifier.

8. A device for establishing a standard voltage from an unstable voltage supply comprising: a controllable means to provide said standard voltage, an electric discharge tube adapted to regulate said controllable means in response to voltage variations to thereby maintain a constant standard voltage, said discharge tube comprising a source of charged particles, detecting means for detecting the said particles traveling from said source along a predetermined beam path, said detecting means being operatively connected to said controllable means, accelerating means for imparting velocity to said particles from said source to said detecting means thereby defining the said beam path, the velocity of said particles being proportional to the magnitude of the voltage applied to said accelerating means, means for controlling said beam path at one velocity of the said particles so that only a portion of the said beam path is detected by said detecting means, said portion thereby exerting a controlling function on said controllable means, and means for varying the voltage on said accelerating means in response to voltage variations whereby the velocity of the particles and the relative portion of the said beam path detected by the detecting means may be varied so that the controllable means may be regulated by said discharge tube to provide a constant standard voltage.

9. A device for establishing a standard voltage from an unstable voltage supply comprising a source of charged particles; a first detecting means for detecting the said particles traveling from said source along a predetermined path, means for imparting velocity to said particles from said source to said detecting means thereby defining a beam path, the velocity of said particles being proportional to the magnitude of the voltage applied to said velocity imparting means, means for controlling said beam path at one velocity of the said particles so that only a portion of the said beam path is detected by said detecting means, means for connecting said velocity imparting means to a voltage source to be regulated so that a variation in the voltage source will be reflected to the controlled beam path, a second detecting means for detecting the said particles traveling from said source along a second predetermined path and means connecting said first detecting means to a control member which is positioned in the second predetermined path to thereby control the electron flow in the second predetermined path according to variations in the regulated voltage source.

10. A device for establishing a standard voltage from an unstable voltage supply comprising: a controllable means operatively associated with and energized by said unstable voltage supply for providing said standard voltage, an electric discharge tube adapted to regulate said controllable means in accordance with variations of said standard voltage for maintaining said standard voltage substantially constant, said discharge tube comprising a source of charged particles, means for detecting the particles traveling from such source along a pre-determined beam path, said detecting means being operatively connected to said controllable means, accelerating means for imparting velocity to said particles from said source to said detecting means thereby defining said beam path, the velocity of said particles being proportional to the magnitude of the voltage applied to said accelerating means, and means for controlling said beam path at one velocity of said particles so that only a portion of said beam path is detected by said detecting means, and means for varying the voltage on said accelerating means in accordance with the variations of said standard voltage whereby the velocity of the particles and the relative portion of said beam path detected by the detecting means is varied in accordance with the variations of said standard voltage to regulated said controllable means to maintain substantially constant said standard voltage.

11. An electric discharge tube comprising: means for supplying charged particles; means for detecting said particles traveling from the supply means along a pre-determined beam path; means for imparting velocity to said particles, the velocity of the particles being proportional to the magnitude of the voltage applied to said velocity imparting means; means for producing an electrostatic field which tends to cause said particles to move in one direction perpendicular to said pre-determined beam path; means for producing a magnetic field which tends to cause said particles to move in an opposite direction to said one direction relative to said pre-determined beam path; means interposed between said supply means and said detecting means permitting only a portion of the particles traveling along said pre-determined beam path to reach said detecting means; and means for varying the voltage on said accelerating means whereby the velocity of the particles may be varied to vary the number of particles reaching the detecting means.

12. The device of claim 11 wherein said means for creating an electrostatic field comprises a pair of parallel plates disposed on opposite sides of said pre-determined beam path, said means for creating a magnetic field comprising a coil having a central axis perpendicular to said pre-determined beam path and parallel to opposing faces of said plates.

References Cited in the file of this patent

UNITED STATES PATENTS

| | | |
|---|---|---|
| 2,144,085 | Roth | Jan. 17, 1939 |
| 2,205,069 | Rust | June 18, 1940 |
| 2,210,394 | Braden | Aug. 6, 1940 |
| 2,330,377 | Phair | Sept. 28, 1943 |
| 2,358,901 | Ziebolz | Sept. 26, 1944 |
| 2,450,602 | Levialdi | Oct. 5, 1948 |
| 2,532,720 | Janssen | Dec. 5, 1950 |
| 2,554,317 | Tolson | May 22, 1951 |
| 2,570,790 | Gray | Oct. 9, 1951 |
| 2,580,355 | Lempert | Dec. 25, 1951 |
| 2,591,998 | Baker | Apr. 8, 1952 |
| 2,611,879 | Adler | Sept. 23, 1952 |
| 2,643,360 | Fairstein | June 23, 1953 |